US011288962B2

(12) United States Patent
Lim (10) Patent No.: US 11,288,962 B2
(45) Date of Patent: Mar. 29, 2022

(54) PLATOONING CONTROLLER, SYSTEM INCLUDING THE SAME, AND METHOD THEREOF

(71) Applicants: Hyundai Motor Company, Seoul (KR); Kia Motors Corporation, Seoul (KR)

(72) Inventor: Jong Su Lim, Hwaseong-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 119 days.

(21) Appl. No.: 16/801,490

(22) Filed: Feb. 26, 2020

(65) Prior Publication Data

US 2021/0090438 A1 Mar. 25, 2021

(30) Foreign Application Priority Data

Sep. 23, 2019 (KR) .................. 10-2019-0116930

(51) Int. Cl.
| | | |
|---|---|---|
| *G08G 1/16* | (2006.01) | |
| *G08G 1/00* | (2006.01) | |
| *B60W 60/00* | (2020.01) | |
| *B60W 50/00* | (2006.01) | |

(52) U.S. Cl.
CPC ......... *G08G 1/161* (2013.01); *B60W 60/0017* (2020.02); *G08G 1/167* (2013.01); *G08G 1/22* (2013.01); *B60W 2050/0075* (2013.01); *B60W 2556/65* (2020.02)

(58) Field of Classification Search
CPC .......... G08G 1/161; G08G 1/167; G08G 1/22; B60W 60/0017; B60W 2556/65; B60W 2050/0075
See application file for complete search history.

(56) References Cited

U.S. PATENT DOCUMENTS

| | | | |
|---|---|---|---|
| 9,632,507 B1* | 4/2017 | Korn | G05D 1/0295 |
| 2019/0263404 A1* | 8/2019 | Bergquist | B60W 30/162 |
| 2020/0286387 A1* | 9/2020 | Zhou | G08G 1/0175 |
| 2021/0245759 A1* | 8/2021 | Yonemura | B60W 30/18163 |

* cited by examiner

*Primary Examiner* — Tyler J Lee
*Assistant Examiner* — Yufeng Zhang
(74) *Attorney, Agent, or Firm* — Slater Matsil, LLP (57) ABSTRACT

A platooning controller is provided. The platooning controller includes a processor configured to perform platooning control when an outside vehicle cuts in during platooning and a storage configured to store information for performing the platooning control. The processor is configured to perform the platooning control based on sensor information of a host vehicle, when the outside vehicle cuts in front of the host vehicle. The processor is configured to determine whether a platooning vehicle which is traveling in front of the host vehicle performs emergency braking, based on communication information received from a vehicle which is platooning in front of the host vehicle.

20 Claims, 10 Drawing Sheets

PLATOONING CONTROLLER, SYSTEM INCLUDING THE SAME, AND METHOD THEREOF

CROSS-REFERENCE TO RELATED APPLICATIONS

This application claims priority to Korean Patent Application No. 10-2019-0116930, filed in the Korean Intellectual Property Office on Sep. 23, 2019, which application is hereby incorporated herein by reference.

TECHNICAL FIELD

The present disclosure relates to a platooning controller, a system including the same, and a method thereof.

BACKGROUND

Platooning is a technology in which a plurality of vehicles performs autonomous driving in the state where they are arranged at a specified interval in line. While the vehicles are platooning, a leading vehicle which is a vehicle located in the frontline of a platooning line may control one or more following vehicles which follow the leading vehicle. The leading vehicle may maintain an interval between the plurality of vehicles included in the platooning line and may exchange information about behaviors and situations of the plurality of vehicles included in the platooning line using vehicle-to-vehicle (V2V) communication. The platooning vehicles may perform inter-vehicle distance control and emergency braking control using V2V communication information received from a forward vehicle and sensor information obtained by a sensor loaded into a host vehicle.

Figure 1:
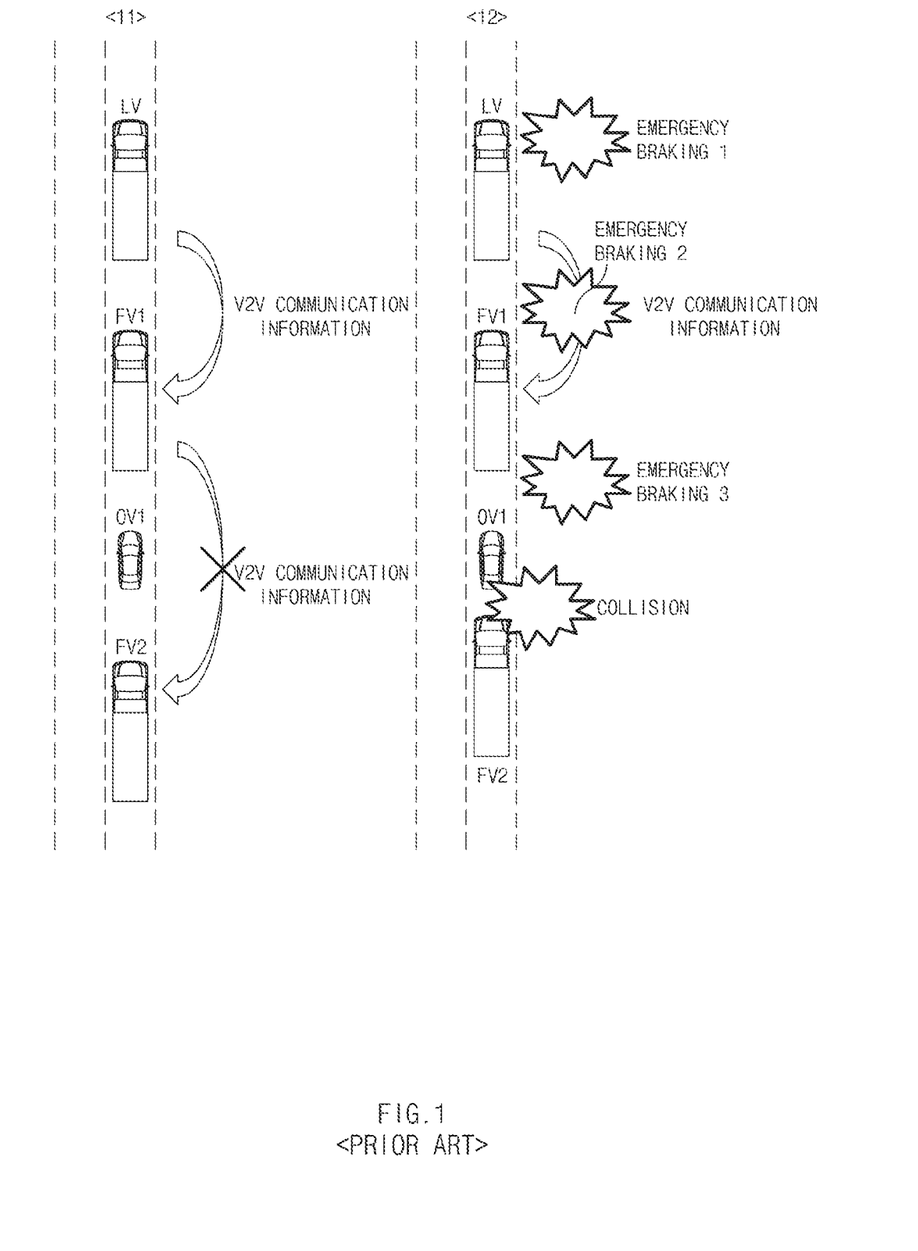
FIG. 1 is a drawing illustrating a platooning control method when an outside vehicle cuts in during platooning.

Referring to reference 11 of FIG. 1, when an outside vehicle OV1 cuts in front of a following vehicle FV2, the following vehicle FV2 is unstable for vehicle control due to the cut-in vehicle OV1 because V2V communication of a following vehicle FV1 differs from sensor information of the following vehicle FV1, which is measured by a sensor of the following vehicle FV2. When the outside vehicle OV1 cuts in, the following vehicle FV2 may perform platooning control using only sensor information without using V2V communication information. When the cut-in vehicle OV1 cuts out, the following vehicle FV2 may perform platooning control using V2V communication information of the following vehicle FV1.

When the following vehicle FV2 performs platooning control using only sensor information without using V2V communication information because there is the cut-in vehicle OV1, as shown at reference numeral 12 of FIG. 1, as a leading vehicle LV performs emergency braking, when the cut-in vehicle OV1 performs emergency braking to stop, a time when the following vehicle FV2 performs emergency braking may be later than a time when the cut-in vehicle OV1 performs emergency braking. Thus, there is a risk that there may be a high probability that the following vehicle FV2 will collide with the cut-in vehicle OV1.

SUMMARY

Embodiments of the present disclosure can solve the above-mentioned problems occurring in the prior art while advantages achieved by the prior art are maintained intact.

Embodiments of the present disclosure include a platooning controller, a system including the same, and a method thereof. Various embodiments describe technologies for performing safe platooning control when an outside vehicle cuts in during platooning.

An embodiment of the present disclosure provides a platooning controller for performing inter-vehicle distance control based on sensor information when an outside vehicle cuts in, determining emergency braking using V2V communication information, and determining validity of a forward platooning vehicle based on GPS information and sensor information received through V2V communication when the cut-in vehicle cuts out to enhance safety of platooning control, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a platooning controller may include a processor that performs platooning control when an outside vehicle cuts in during platooning and a storage that stores information for the platooning control. The processor may perform the platooning control based on sensor information of a host vehicle, when the outside vehicle cuts in front of the host vehicle, and may determine whether a platooning vehicle which is traveling in front of the host vehicle performs emergency braking, based on communication information received from a vehicle which is platooning in front of the host vehicle.

In an embodiment, the processor may determine whether a vehicle which is traveling in front of the host vehicle is a vehicle which is platooning, based on the communication information received from the vehicle which is platooning in front of the host vehicle when the cut-in vehicle cuts out.

In an embodiment, the processor may compare a distance from the vehicle which is traveling in front of the host vehicle, the distance being obtained based on the sensor information, with a distance from the vehicle which is traveling in front of the host vehicle, the distance being obtained based on global positioning system (GPS) information in the communication information, to determine whether the vehicle which is traveling in front of the host vehicle is the vehicle which is platooning.

In an embodiment, the processor may determine whether the platooning vehicle which is traveling in front of the host vehicle performs the emergency braking, based on instantaneous variation in required deceleration of the platooning vehicle which is traveling in front of the host vehicle and a magnitude of change in the required deceleration in the communication information.

In an embodiment, the processor may perform emergency braking of the host vehicle, when it is determined that the platooning vehicle performs the emergency braking based on the communication information while the cut-in vehicle is traveling in front of the host vehicle.

According to another embodiment of the present disclosure, a vehicle system may include a communication device that performs communication between platooning vehicles, a sensing device that senses information of a forward vehicle, and a platooning controller that performs platooning control based on sensor information of a host vehicle, when an outside vehicle cuts in front of the host vehicle, and determines whether a platooning vehicle which is traveling in front of the host vehicle performs emergency braking, based on communication information received from a vehicle which is platooning in front of the host vehicle.

In an embodiment, the communication device may perform vehicle-to-vehicle (V2V) communication.

In an embodiment, the sensing device may sense at least one or more of a location, a speed, or a relative distance of the forward vehicle.

In an embodiment, the platooning controller may determine whether a vehicle which is traveling in front of the host vehicle is a vehicle which is platooning, based on the communication information received from the vehicle which is platooning in front of the host vehicle when the cut-in vehicle cuts out.

In an embodiment, the platooning controller may compare a distance from the vehicle which is traveling in front of the host vehicle, the distance being obtained based on the sensor information, with a distance from the vehicle which is traveling in front of the host vehicle, the distance being obtained based on GPS information in the communication information, to determine whether the vehicle which is traveling in front of the host vehicle is the vehicle which is platooning.

In an embodiment, the platooning controller may determine whether the platooning vehicle which is traveling in front of the host vehicle performs the emergency braking, based on instantaneous variation in required deceleration of the platooning vehicle which is traveling in front of the host vehicle and a magnitude of change in the required deceleration in the communication information.

According to another embodiment of the present disclosure, a platooning control method may include transmitting and receiving platooning information through communication between platooning vehicles, sensing information of a forward vehicle, performing platooning control based on sensor information of a host vehicle, when an outside vehicle cuts in front of the host vehicle, and determining whether a platooning vehicle which is traveling in front of the host vehicle performs emergency braking, based on communication information received from a vehicle which is platooning in front of the host vehicle.

In an embodiment, the platooning control method may further include determining whether a vehicle which is traveling in front of the host vehicle is a vehicle which is platooning, based on the communication information received from the vehicle which is platooning in front of the host vehicle when the cut-in vehicle cuts out.

In an embodiment, determining whether the vehicle which is traveling in front of the host vehicle is the vehicle which is platooning may include comparing a distance from the vehicle which is traveling in front of the host vehicle, the distance being obtained based on the sensor information, with a distance from the vehicle which is traveling in front of the host vehicle, the distance being obtained based on GPS information in the communication information, to determine whether the vehicle which is traveling in front of the host vehicle is the vehicle which is platooning.

In an embodiment, determining whether the platooning vehicle performs the emergency braking may include determining whether the platooning vehicle which is traveling in front of the host vehicle performs the emergency braking, based on instantaneous variation in required deceleration of the platooning vehicle which is traveling in front of the host vehicle and a magnitude of change in the required deceleration in the communication information.

BRIEF DESCRIPTION OF THE DRAWINGS

The above and other objects, features and advantages of the present disclosure will be more apparent from the following detailed description taken in conjunction with the accompanying drawings in which.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, a description will be given in detail of embodiments of the present disclosure with reference to FIGS. 2 through 10.

A leading vehicle (LV) and a following vehicle (FV), which are included in a platooning group, may perform platooning on the road. The LV and the FV may travel while maintaining a specified distance. While the LV and the FV are traveling, the LV and the FV may adjust a distance between the LV and the FV based on sensor information and platooning information shared through vehicle-to-vehicle (V2V) communication.

Figure 2:
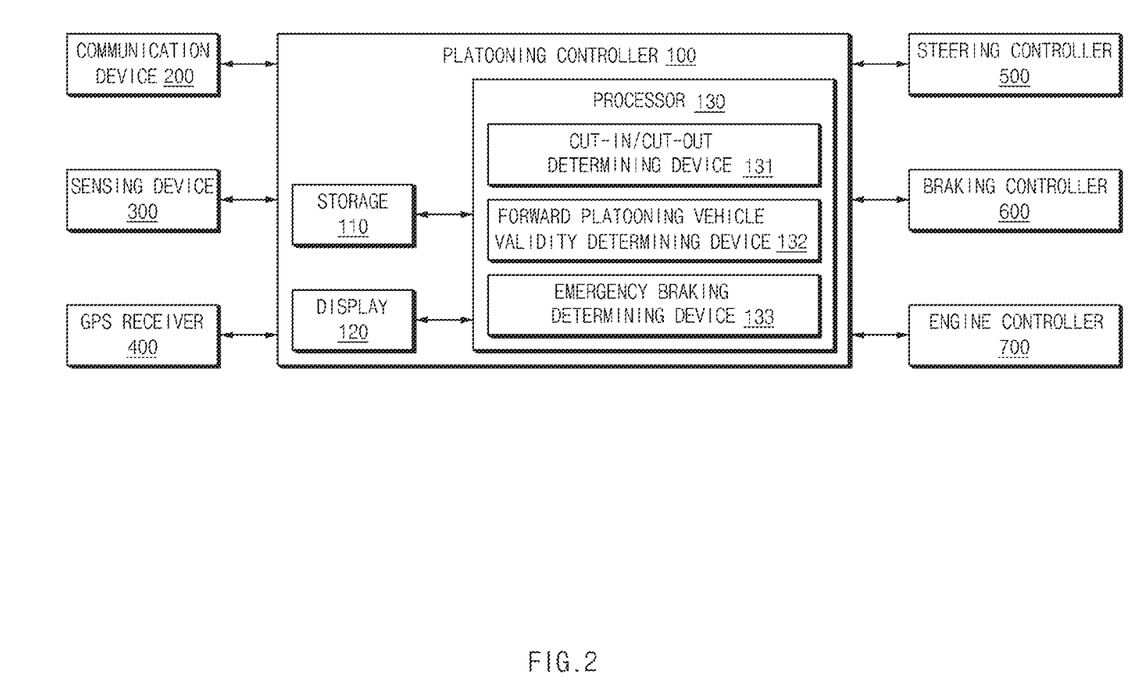
FIG. 2 is a block diagram illustrating a configuration of a vehicle system including a platooning controller according to an embodiment of the present disclosure.
Figure 3:
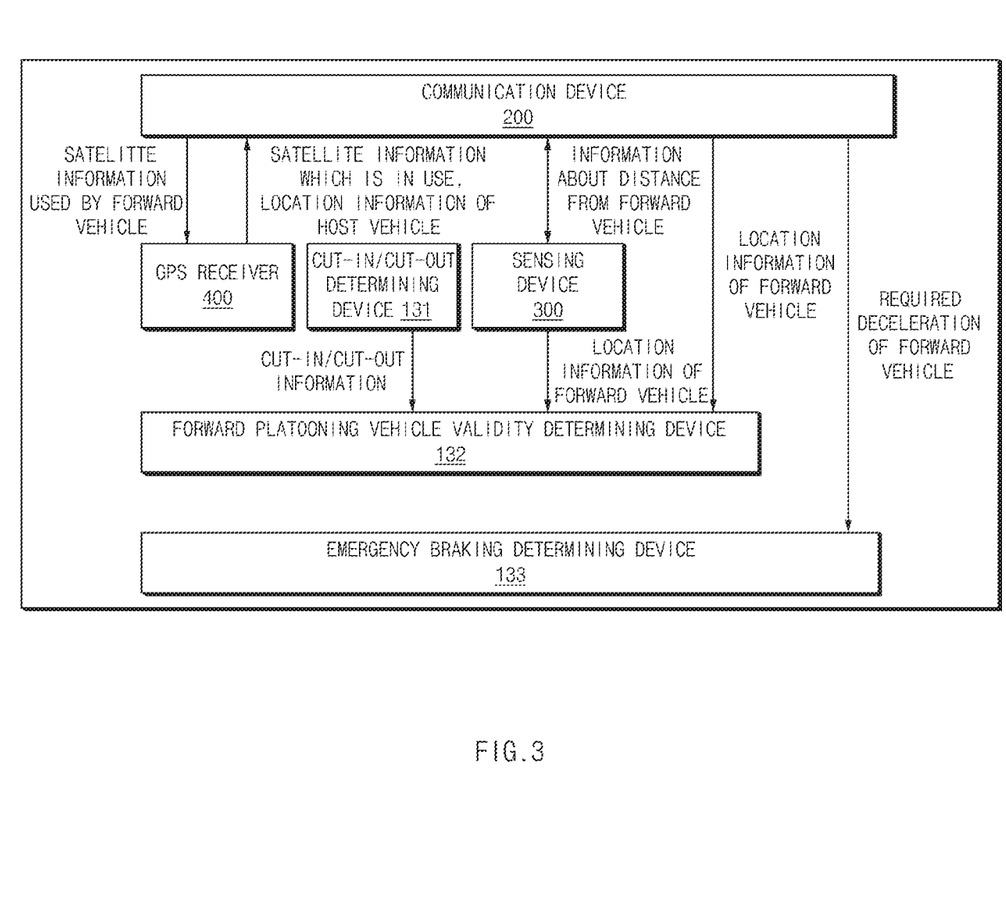
FIG. 3 is a drawing illustrating information flow of a platooning controller according to an embodiment of the present disclosure.

FIG. 2 is a block diagram illustrating a configuration of a vehicle system including a platooning controller according to an embodiment of the present disclosure. FIG. 3 is a drawing illustrating information flow of a platooning controller according to an embodiment of the present disclosure.

Referring to FIG. 2, the vehicle system according to an embodiment of the present disclosure may include a platooning controller 100, a communication device 200, a sensing device 300, a global positioning system (GPS) receiver 400, a steering controller 500, a braking controller 600, and an engine controller 700.

The platooning controller 100 may perform platooning control based on sensor information, when an outside vehicle cuts in front of a host vehicle, and may determine whether a platooning vehicle which is traveling in front of the host vehicle performs emergency braking, based on communication information received from a vehicle which is platooning in front of the host vehicle. Furthermore, when the cut-in vehicle cuts out, the platooning controller 100 may determine whether a vehicle which is traveling in front of the host vehicle is a vehicle which is platooning. In this case, the sensor information may include information, for example, information about an inter-vehicle distance from a forward vehicle, a speed of the forward vehicle, a location of the forward vehicle, a movement direction of the forward vehicle, and the like, which are measured by the sensing device 300. The communication information may be information received based on vehicle-to-vehicle (V2V) communication from vehicles in a platooning line and may include information sensed by each of the vehicles in the platooning line.

The platooning controller 100 may include a storage 110, a display 120, and a processor 130.

The storage 110 may store a sensing result of the sensing device 300 and V2V communication information or the like received from the vehicles in the platooning line. The storage 110 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 120 may be controlled by the processor 130 to display platooning information. Particularly, in an embodiment of the present disclosure, the display 120 may display information about a cut-in vehicle in front of the host vehicle (e.g., information about a location of the cut-in vehicle, whether an outside vehicle cuts in, whether the cut-in vehicle cuts out, a speed of the cut-in vehicle, and an inter-vehicle distance). The display 120 may be implemented as a head-up display (HUD), a cluster, an audio video navigation (AVN), a human machine interface (HMI), or the like. Furthermore, the display 120 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, or a three-dimensional (3D) display. Some displays thereof may be implemented as transparent displays configured as a transparent type or a semi-transparent type to see the outside. Moreover, the display 120 may be implemented as a touchscreen including a touch panel to be used as an input device other than an output device.

The processor 130 may be electrically connected with the storage 110, the display 120, or the like and may electrically control the respective components. The processor 130 may be an electrical circuit which executes instructions of software and may perform a variety of data processing and calculations as described below.

The processor 130 may perform the platooning control based on sensor information, when an outside vehicle cuts in front of the host vehicle, and may determine whether a platooning vehicle which is traveling in front of the host vehicle performs emergency braking, based on communication information received from a vehicle which is platooning in front of the host vehicle.

In other words, when the cut-in vehicle cuts out, the processor 130 may determine whether a vehicle which is traveling in front of the host vehicle is a vehicle which is platooning, based on communication information received from the vehicle which is platooning in front of the host vehicle.

The processor 130 may compare a distance from the vehicle which is traveling in front of the host vehicle, which is obtained based on sensor information, with a distance from the vehicle which is traveling in front of the host vehicle, which is obtained based on GPS information in communication information, to determine whether the vehicle which is traveling in front of the host vehicle is the vehicle which is platooning. In other words, the processor 130 may obtain information about a distance from a forward vehicle using GPS location information of the forward vehicle, received from the forward vehicle information through V2V communication, and GPS location information of the host vehicle.

The processor 130 may determine whether a platooning vehicle which is traveling in front of the host vehicle performs emergency braking, based on instantaneous variation in required deceleration of the platooning vehicle which is traveling in front of the host vehicle and a magnitude of change in the required deceleration in communication information. In other words, when the instantaneous variation in required deceleration of the platooning vehicle which is traveling in front of the host vehicle is greater than a predetermined reference value A and when the magnitude of change in the required deceleration is greater than a predetermined reference value B, the processor 130 may determine that the platooning vehicle which is traveling in front of the host vehicle performs the emergency braking.

When it is determined that emergency braking occurs based on communication information while a cut-in vehicle is traveling in front of the host vehicle, the processor 130 may perform emergency braking of the host vehicle.

The processor 130 may include a cut-in/cut-out determining device 131, a forward platooning vehicle validity determining device 132, and an emergency braking determining device 133.

Referring to FIG. 3, the communication device 200 may transmit location information of the host vehicle, which is received from the GPS receiver 400, information (e.g., an inter-vehicle distance, a location, a speed, or the like) sensed by the sensing device 300, required deceleration of the host vehicle, which is obtained from a device in the host vehicle, or the like to another vehicle outside the host vehicle and may deliver V2V communication information, received from the other vehicle, to the cut-in/cut-out determining device 131, the forward platooning vehicle validity determining device 132, and the emergency braking determining device 133.

The cut-in/cut-out determining device 131 may deliver cut-in/cut-out information to the forward platooning vehicle validity determining device 132. The sensing device 300 may deliver information about a distance from a forward vehicle to the forward platooning vehicle validity determining device 132.

The cut-in/cut-out determining device 131 may determine whether an outside vehicle cuts in or whether a cut-in vehicle cuts out, based on sensing information of the sensing device 300.

The forward platooning vehicle validity determining device 132 may determine validity of a forward platooning vehicle based on information about the result of determining whether the outside vehicle cuts in or whether the cut-in vehicle cuts out, information about a distance from a forward vehicle, which is received from the sensing device 300, and location information of the forward vehicle, which is received from the GPS receiver 400.

In other words, the forward platooning vehicle validity determining device 132 may determine whether a distance from the forward vehicle, which is received from the sensing device 300, is the same as a distance from the forward vehicle, which is received from the GPS receiver 400, to determine whether the forward vehicle is a cut-in vehicle or a vehicle which is platooning.

The emergency braking determining device 133 may previously determine whether forward vehicles perform emergency braking, based on required deceleration of each of the forward vehicles in V2V communication information to correspond to the emergency braking.

The communication device 200 may perform V2V communication between vehicles which are platooning and may include a hardware device implemented with various electronic circuits, for example, a mobile communication unit, a broadcast receiving unit, such as a digital multimedia broadcasting (DMB) module or a digital video broadcasting-handheld (DVB-H) module, a short-range communication unit, such as a ZigBee module or a near field communication (NFC) module which is a Bluetooth module, and a wireless-fidelity (Wi-Fi) unit.

The sensing device 300 may sense a relative speed, a relative distance, a movement direction, and the like of a forward vehicle and may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

The GPS receiver 400 may receive a GPS signal from a GPS satellite.

The steering controller 500 may be configured to control a steering angle of the host vehicle and may include a steering wheel, an actuator interlocked with the steering wheel, and a controller for controlling the actuator.

The braking controller 600 may be configured to control braking of the host vehicle and may include a controller for controlling a brake.

The engine controller 700 may be configured to control driving of an engine of the host vehicle and may include a controller for controlling a speed of the host vehicle.

Figure 4:
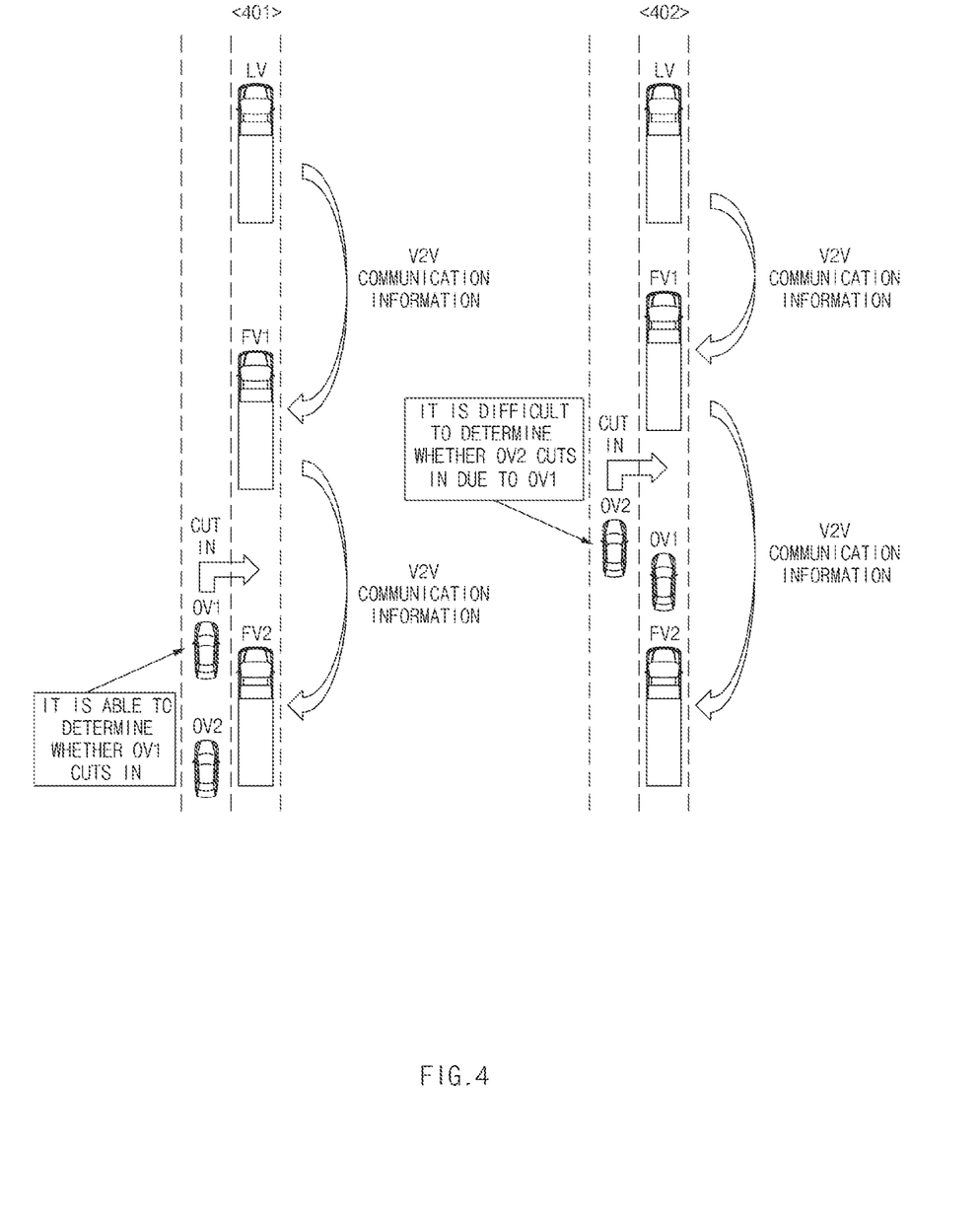
FIG. 4 is a drawing illustrating an example in which it is difficult for an outside vehicle to cut in during platooning according to an embodiment of the present disclosure.
Figure 5:
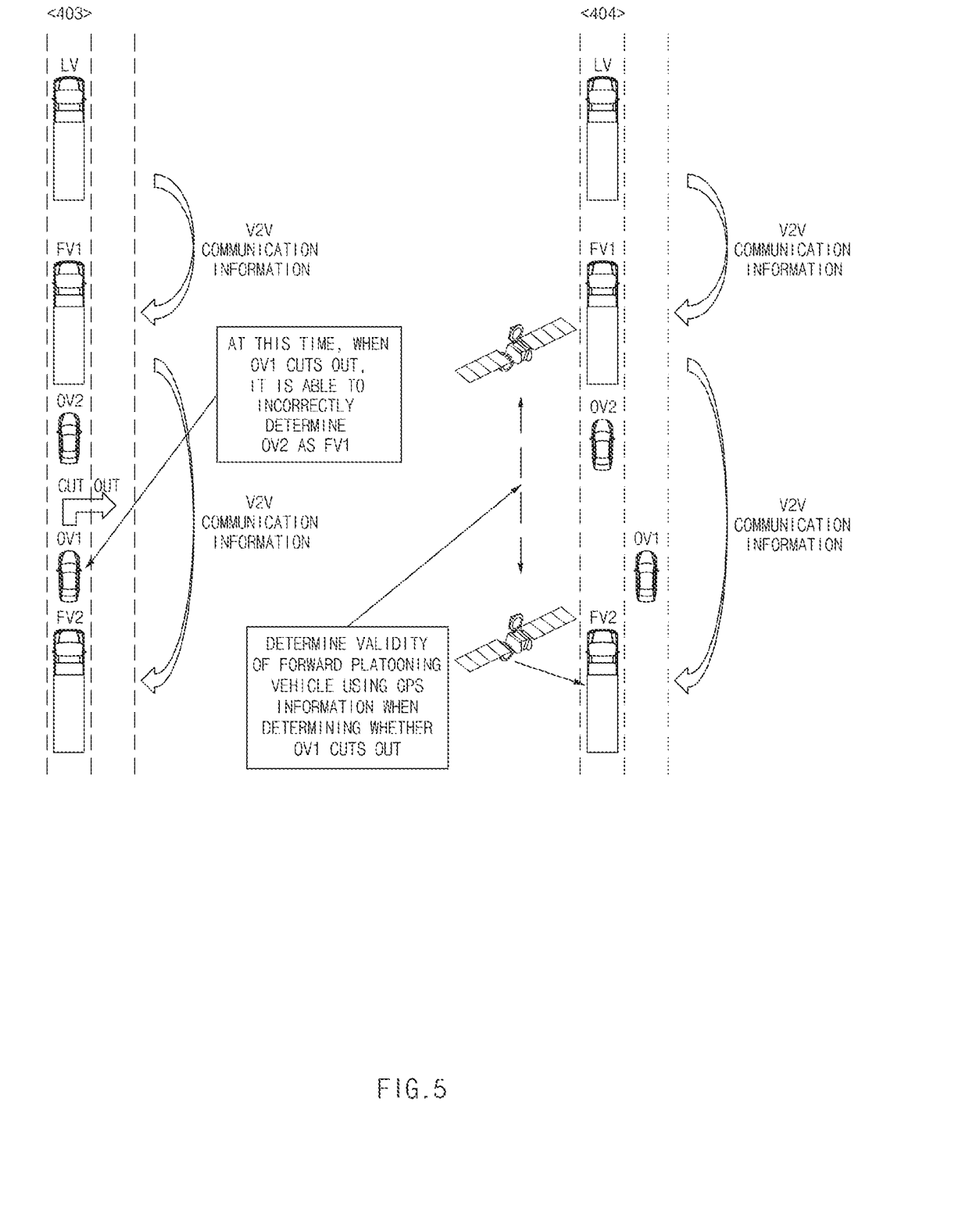
FIG. 5 is a drawing illustrating an example in which it is difficult for a cut-in vehicle to cut out during platooning according to an embodiment of the present disclosure.

FIG. 4 is a drawing illustrating an example in which it is difficult for an outside vehicle to cut in during platooning according to an embodiment of the present disclosure. FIG. 5 is a drawing illustrating an example in which it is difficult for a cut-in vehicle to cut out during platooning according to an embodiment of the present disclosure.

Referring to reference numeral 401 of FIG. 4, a platooning controller 100 of a host vehicle may perform platooning control based on V2V communication information transmitted and received between platooning vehicles while a leading vehicle LV, a following vehicle FV1, and a following vehicle FV2 are platooning and sensor information of the host vehicle. When an outside vehicle OV1 attempts to cut in between the following vehicle FV1 and the following vehicle FV2 during platooning, the following vehicle FV2 may determine whether the outside vehicle OV1 cuts in, through sensing of a sensing device loaded into the following vehicle FV2. In this case, when the outside vehicle OV1 cuts in, the following vehicle FV2 may continue to perform inter-vehicle distance control using sensor information rather than V2V communication information and may continue transmitting and receiving V2V communication information to use the V2V communication information to determine emergency braking.

In reference 402 of FIG. 4, an embodiment is exemplified as an outside vehicle OV2 cuts in between the following vehicle FV1 and the cut-in vehicle OV1. In this case, it may be difficult for the following vehicle FV2 to determine whether the outside vehicle OV2 newly cut in due to the cut-in vehicle OV1.

Referring to reference numeral 403 of FIG. 5, in a state where the outside vehicles OV2 and OV1 are cut in in order between the following vehicle FV1 and the following vehicle FV2 and where the following vehicle FV2 does not recognize the situation where the outside vehicle OV2 cuts in, when the cut-in vehicle OV1 cuts out, the following vehicle FV2 may incorrectly determine the cut-in vehicle OV2 as the following vehicle FV1 in front of the following vehicle FV2.

Referring to reference numeral 404 of FIG. 5, when the cut-in vehicle OV1 cuts out, the following vehicle FV2 may determine whether the cut-in vehicle OV2 in front of the following vehicle FV2 is the following vehicle FV1, using GPS information and sensor information. In other words, the following vehicle FV2 may determine whether a distance from a forward vehicle, which is measured by its sensing device, is identical to a distance between the following vehicle FV2 and the forward vehicle, which is obtained based on GPS information received from the forward vehicle through V2V communication and GPS information of the following vehicle FV2. When the distances are identical to each other, the following vehicle FV2 may determine that the forward vehicle is a valid vehicle which is platooning, rather than the cut-in vehicle.

Figure 6:
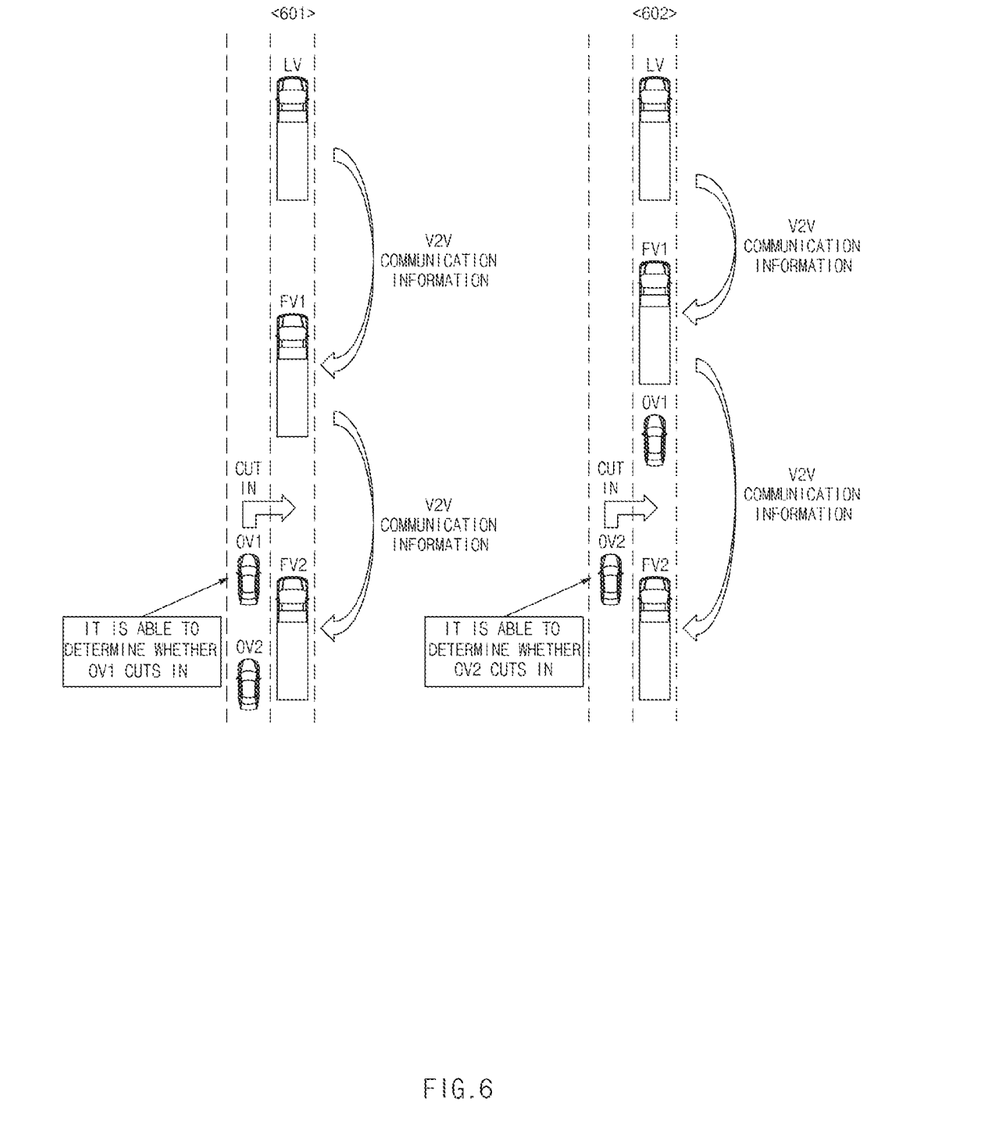
FIG. 6 is a drawing illustrating an example in which it is possible to determine whether an outside vehicle cuts in during platooning according to an embodiment of the present disclosure.
Figure 7:
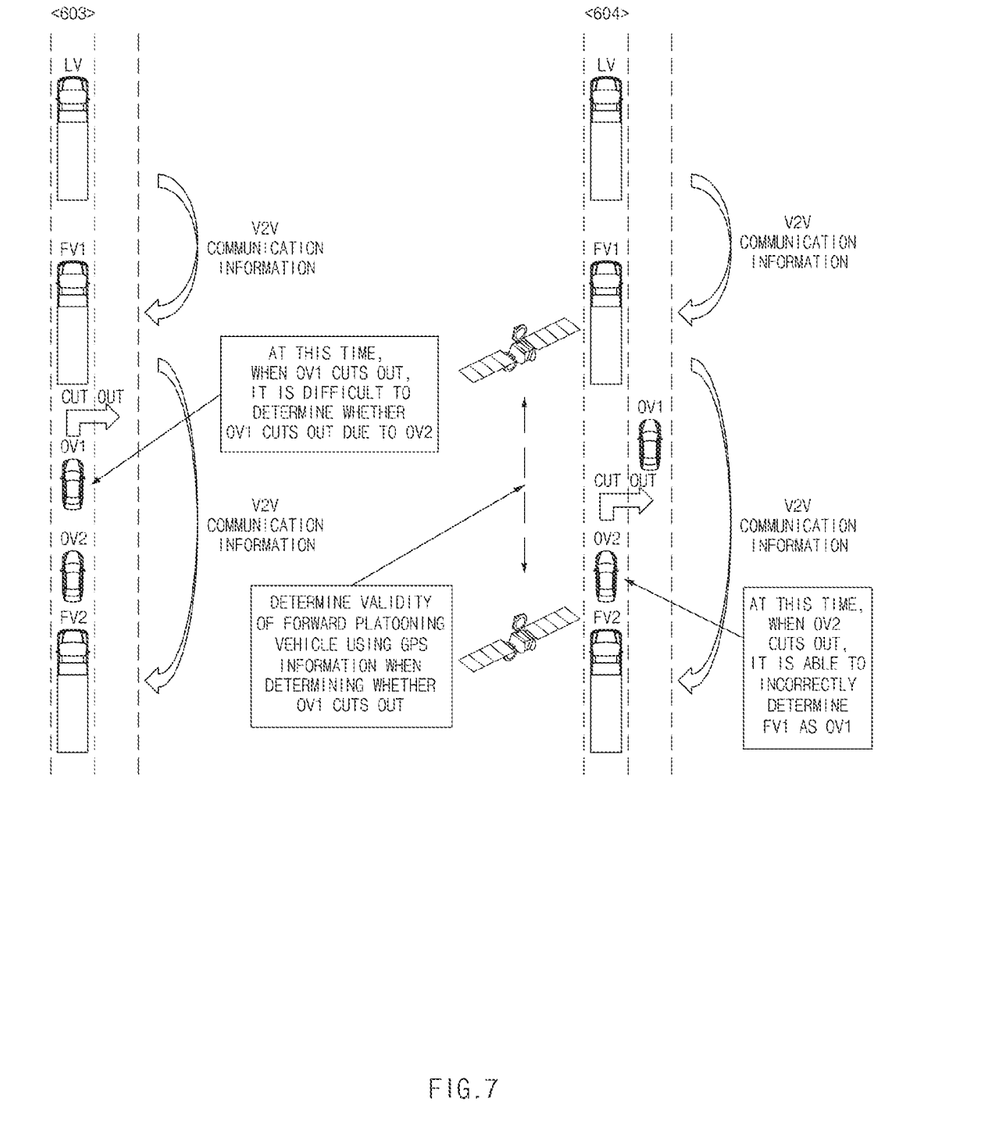
FIG. 7 is a drawing illustrating an example in which it is difficult to determine whether a cut-in vehicle cuts out during platooning according to an embodiment of the present disclosure.

FIG. 6 is a drawing illustrating an example in which it is possible to determine whether an outside vehicle cuts in during platooning according to an embodiment of the present disclosure. FIG. 7 is a drawing illustrating an example in which it is difficult to determine whether a cut-in vehicle cuts out during platooning according to an embodiment of the present disclosure.

Referring to reference numeral 601 of FIG. 6, when an outside vehicle OV1 cuts in between a following vehicle FV1 and a following vehicle FV2 while a leading vehicle LV, the following vehicle FV1, and the following vehicle FV2 are platooning, the following vehicle FV2 may determine whether the outside vehicle OV1 cuts in, through sensing of a sensing device loaded into the following vehicle FV2.

Referring to reference numeral 602 of FIG. 6, when an outside vehicle OV2 cuts in between the cut-in vehicle OV1 and the following vehicle FV2, because the cut-in vehicle OV2 is located immediately in front of the following vehicle FV2, the following vehicle FV2 may determine that the outside vehicle OV2 cuts in.

Referring to reference numeral 603 of FIG. 7, when the cut-in vehicles OV1 and OV2 cut in in order between the following vehicle FV1 and the following vehicle FV2, it may be difficult for the following vehicle FV2 to determine whether the cut-in vehicle OV1 cuts out due to the cut-in vehicle OV2.

Referring to reference numeral 604 of FIG. 7, when the cut-in vehicle OV1 first cuts out and when the cut-in vehicle OV2 then cuts out, because the cut-in vehicle OV2 cuts out in a state where the following vehicle FV2 does not recognize that the cut-in vehicle OV1 cuts out, the following vehicle FV2 may incorrectly determine that the following vehicle FV1 in front of the following vehicle FV2 is the cut-in vehicle OV1.

Thus, when the cut-in vehicle OV2 cuts out, an embodiment of the present disclosure may determine whether a vehicle in front of the host vehicle is a platooning vehicle, using GPS location information of the forward vehicle in V2V communication information and information about a distance from the following vehicle, which is obtained by a sensing device of the host vehicle.

Figure 8:
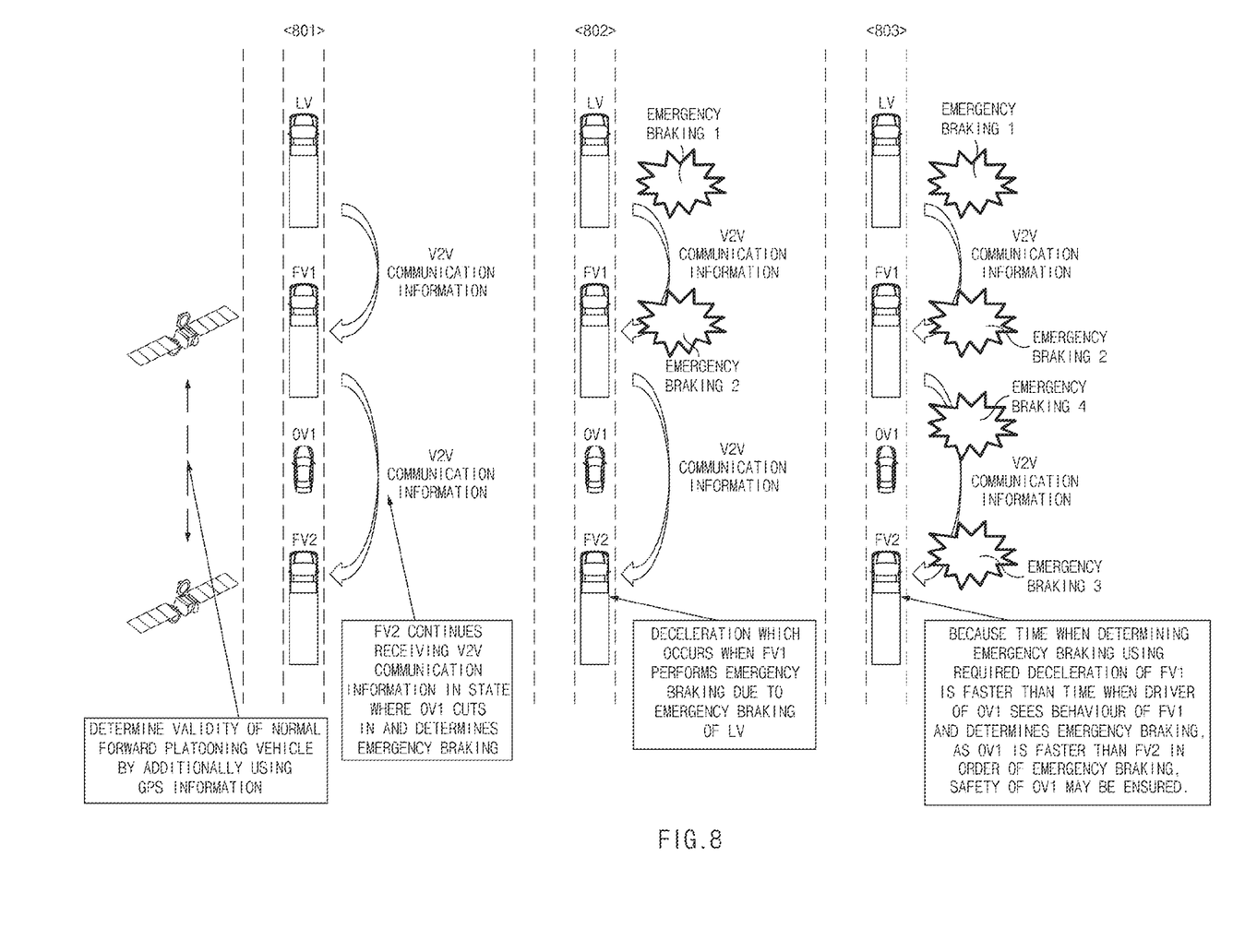
FIG. 8 is a drawing illustrating an exemplary operation of determining emergency braking when there is a cut-in vehicle during platooning according to an embodiment of the present disclosure.

FIG. 8 is a drawing illustrating an exemplary operation of determining emergency braking when there is a cut-in vehicle during platooning according to an embodiment of the present disclosure.

Referring to reference numeral 801 of FIG. 8, when an outside vehicle OV1 cuts in between a following vehicle FV1 and a following vehicle FV2, the following vehicle FV2 may perform inter-vehicle distance control using sensor information obtained by its sensing device rather than V2V communication information and may determine whether the forward vehicle FV1 performs emergency braking using the V2V communication information.

In other words, the following vehicle FV2 may determine validity of the forward vehicle FV1 using GPS location information of the forward vehicle FV1, received based on V2V communication, and may determine whether the forward vehicle FV1 performs emergency braking, using V2V communication information.

Referring to reference numeral 802 of FIG. 8, as a leading vehicle LV performs emergency braking, when the following vehicle FV1 also performs emergency braking, required deceleration of the following vehicle FV1 may be changed. When the required deceleration of the following vehicle FV1 in front of the following vehicle FV2 changes to a predetermined value or more, the following vehicle FV2 may determine that the following vehicle FV1 performs emergency braking and may perform emergency braking earlier than or at the same time the cut-in vehicle performs emergency braking.

Thus, referring to reference numeral 803 of FIG. 8, emergency braking may be performed in an order of emergency braking 1 of the leading vehicle LV, emergency braking 2 of the following vehicle FV1, emergency braking 3 of the following vehicle FV2, and emergency braking 4 of the cut-in vehicle OV1, thus preventing a collision between the cut-in vehicle OV1 and the following vehicle FV2.

Figure 9:
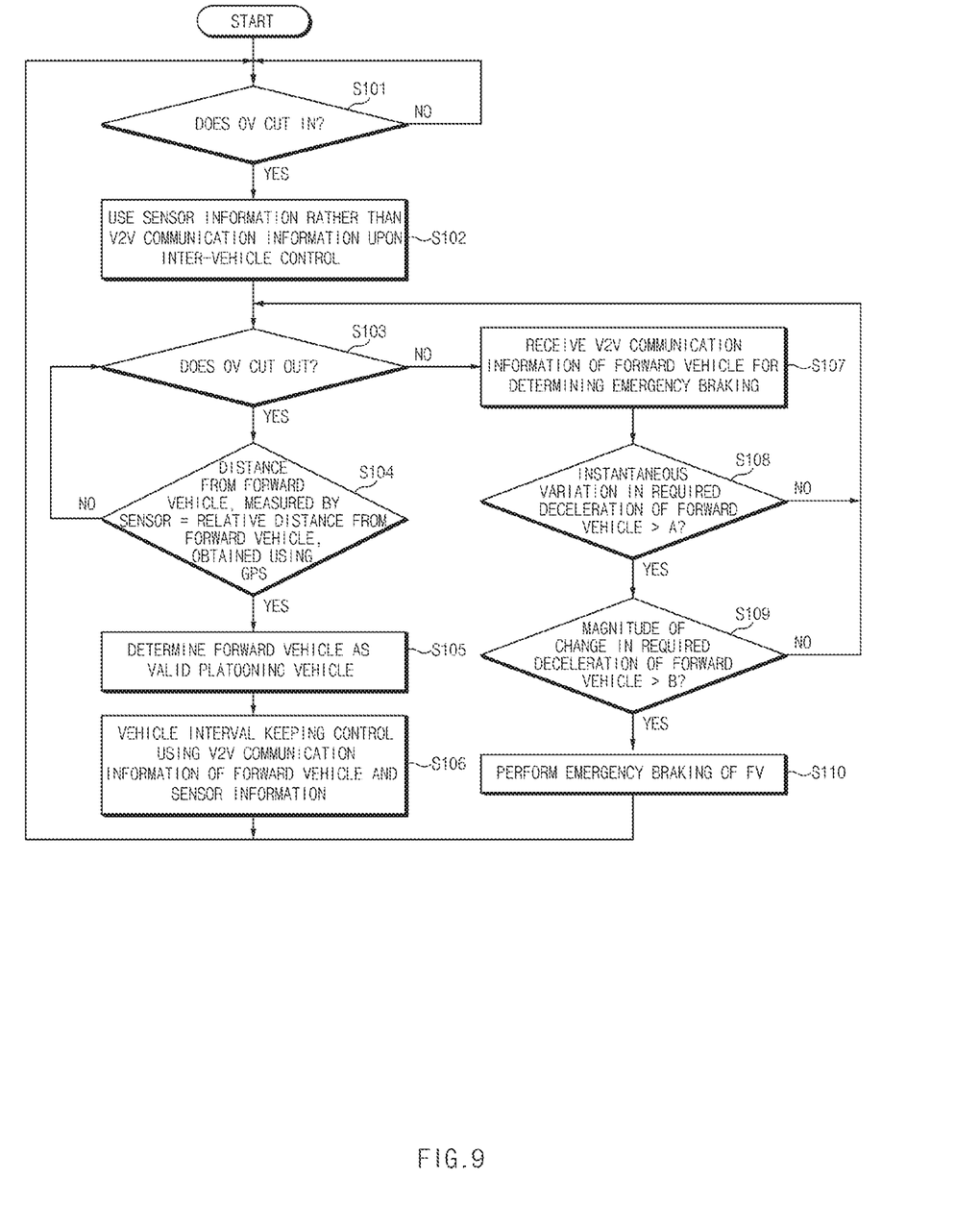
FIG. 9 is a flowchart illustrating a platooning control method when an outside vehicle cuts in according to an embodiment of the present disclosure.

Hereinafter, a description will be given in detail of a platooning control method when an outside vehicle cuts in, according to an embodiment of the present disclosure. FIG. 9 is a flowchart illustrating a platooning control method when an outside vehicle cuts in according to an embodiment of the present disclosure.

Hereinafter, it is assumed that a platooning controller 100 of FIG. 2 performs a process of FIG. 9. An operation described as being performed by an apparatus may be understood as being controlled by a processor 130 of the platooning controller 100. In this case, in FIG. 9, an embodiment is exemplified as a platooning controller 100 loaded into a vehicle behind a vehicle which cuts in while a leading vehicle LV, a following vehicle FV1, and a following vehicle FV2 are platooning in order performs the process of FIG. 9.

Referring to FIG. 9, in S101, the apparatus may determine whether an outside vehicle OV cuts in front of a host vehicle during platooning. In this case, the apparatus may determine whether the outside vehicle OV cuts in front of the host vehicle, using sensor information of a sensing device 300 of the host vehicle.

When the outside vehicle OV cuts in front of the host vehicle, in S102, the apparatus may perform inter-vehicle distance control using sensor information rather than V2V communication information.

In S103, the apparatus may determine whether the cut-in vehicle cuts out. When the cut-in vehicle cuts out, in S104, the apparatus may determine whether a distance from a forward vehicle, which is obtained by sensor information, is identical to a distance from the forward vehicle, which is obtained using GPS location information of the forward vehicle, which is received based on V2V communication, and GPS location information of the host vehicle to determine validity indicating whether the forward vehicle is a platooning vehicle.

When the distance from the forward vehicle, which is obtained by the sensor information, is identical to the distance from the forward vehicle, which is obtained based on the GPS location information in the V2V communication information, in S105, the apparatus may determine whether the forward vehicle is a valid vehicle which is platooning. When the distances are not identical to each other, the apparatus may determine whether the cut-in vehicle does not cut out and may continue determining whether the cut-in vehicle cuts out.

When it is determined that the forward vehicle is the valid platooning vehicle, in S106, the apparatus may perform vehicle interval keeping control using V2V communication information and sensor information.

When the cut-in vehicle does not cut out in S103, in S107, the apparatus may continue receiving V2V communication information. In S108, the apparatus may determine whether instantaneous variation in required deceleration of the forward vehicle is greater than a predetermined reference value A.

When the instantaneous variation in the required deceleration of the forward vehicle is greater than the predetermined reference value A, in S109, the apparatus may determine whether a magnitude value of change in the required deceleration of the forward vehicle in V2V communication information is greater than a predetermined reference value B. When the magnitude value of change in the required deceleration of the forward vehicle is greater than a predetermined reference value B, in S110, the apparatus may determine that the forward vehicle performs emergency braking and may perform emergency braking (full braking) of the host vehicle. In this case, when the forward vehicle does not perform emergency braking, the apparatus may continue determining whether the cut-in vehicle cuts out.

Thus, the apparatus may determine whether the host vehicle performs emergency braking, based on V2V communication information of a preceding platooning vehicle, irrespective of whether a cut-in vehicle in front of the host vehicle performs emergency braking, thus performing safe emergency braking control.

As such, an embodiment of the present disclosure may perform inter-vehicle distance control using only sensor information when an outside vehicle cuts in during platooning, may continue receiving V2V communication information, and may determine whether a forward vehicle performs emergency braking during platooning to quickly correspond to the emergency braking, thus preventing an accident of collision with the cut-in vehicle.

Furthermore, when the cut-in vehicle cuts out during platooning, an embodiment of the present disclosure may determine validity of a forward vehicle based on GPS location information received based on V2V communication, thus enhancing safety of platooning control.

Figure 10:
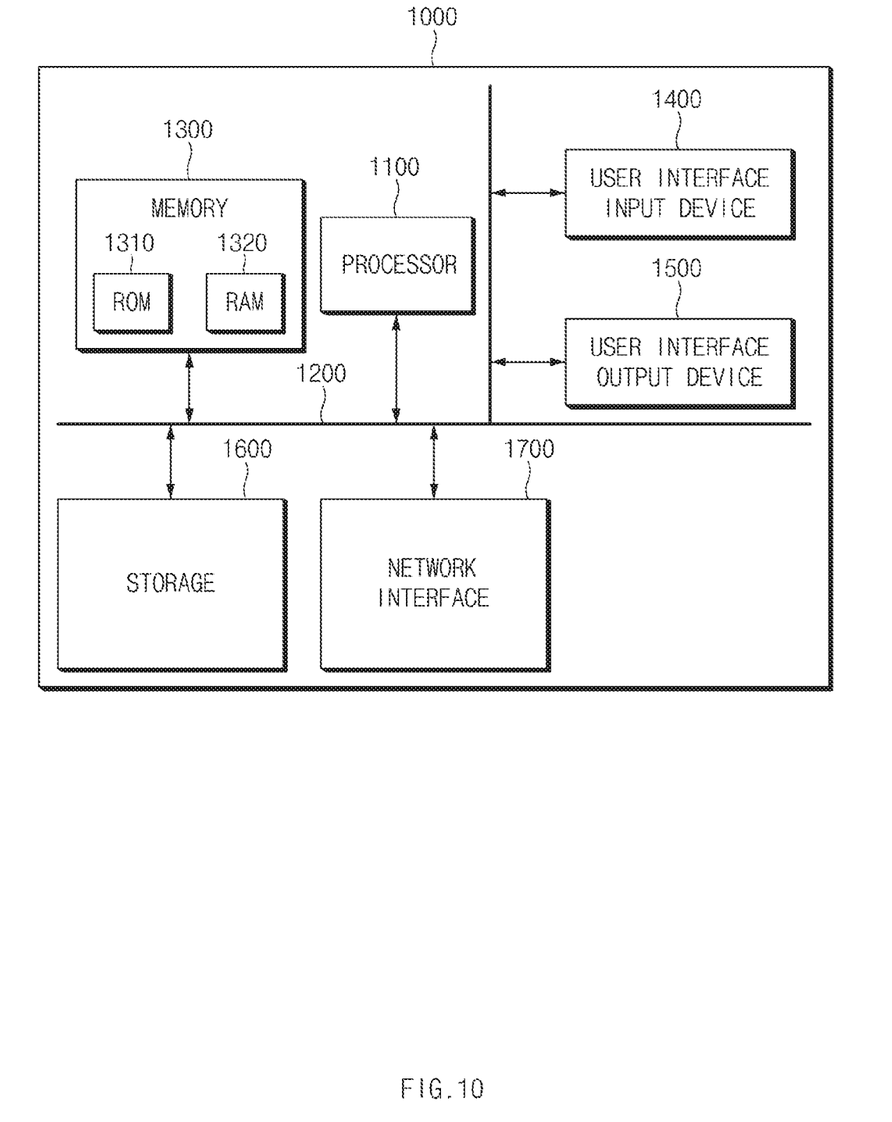
FIG. 10 is a block diagram illustrating a computing system according to an embodiment of the present disclosure.

FIG. 10 is a block diagram illustrating a computing system according to an embodiment of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may perform inter-vehicle distance control based on sensor information when an outside vehicle cuts in, may determine emergency braking using V2V communication information, and may determine validity of a forward platooning vehicle based on GPS information and sensor information received through V2V communication when the cut-in vehicle cuts out, thus enhancing safety of platooning control.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A platooning controller for a host vehicle that includes a sensor and a communication device, the platooning controller comprising:
   a processor configured to perform platooning control when an outside vehicle cuts in during platooning; and
   a storage configured to store information for performing the platooning control,
   wherein the processor is configured to:
      perform the platooning control based on sensor information from the sensor and communication information received at the communication device from a vehicle that is platooning in front of the host vehicle, when no outside vehicle cuts in front of the host vehicle;
      perform inter-vehicle distance control based on sensor information from the sensor of the host vehicle, when the outside vehicle cuts in front of the host vehicle; and
      determine whether a platooning vehicle which is traveling in front of the host vehicle performs emergency braking, based on the communication information received from the vehicle which is platooning in front of the host vehicle, when the outside vehicle cuts in front of the host vehicle.

2. The platooning controller of claim 1, wherein the processor is configured to determine whether a vehicle traveling in front of the host vehicle is a vehicle which is platooning based on the communication information received from the vehicle which is platooning in front of the host vehicle when the outside vehicle cuts out.

3. The platooning controller of claim 2, wherein the processor is configured to compare a first distance from the vehicle traveling in front of the host vehicle, the first distance being obtained based on the sensor information, with a second distance from the vehicle traveling in front of the host vehicle, the second distance being obtained based on global positioning system (GPS) information in the communication information, to determine whether the vehicle traveling in front of the host vehicle is the vehicle which is platooning.

4. The platooning controller of claim 1, wherein the processor is configured to determine whether the platooning vehicle which is traveling in front of the host vehicle performs the emergency braking based on instantaneous variation in required deceleration of the platooning vehicle which is traveling in front of the host vehicle and a magnitude of change in the required deceleration in the communication information.

5. The platooning controller of claim 1, wherein the processor is configured to perform emergency braking of the host vehicle when it is determined that the platooning vehicle performs the emergency braking based on the communication information while the outside vehicle is traveling in front of the host vehicle.

6. A vehicle system of a host vehicle, the vehicle system comprising:
a communication device configured to perform communication between platooning vehicles;
a sensing device configured to obtain sensor information of a forward vehicle, the forward vehicle being either a platoon vehicle that is platooning in front of the host vehicle or an outside vehicle that cuts in front of the host vehicle; and
a platooning controller configured to:
perform platooning control based on sensor information from the host vehicle and communication information received from the platoon vehicle when the forward vehicle is the platoon vehicle;
perform inter-vehicle distance control based on the sensor information of the host vehicle when the forward vehicle is the outside vehicle; and
determine whether the platoon vehicle performs emergency braking based on the communication information received from the platoon vehicle when the forward vehicle is the outside vehicle.

7. The vehicle system of claim 6, wherein the communication device is configured to perform vehicle-to-vehicle (V2V) communication.

8. The vehicle system of claim 6, wherein the sensing device is configured to sense at least one or more of a location, a speed, or a relative distance of the forward vehicle.

9. The vehicle system of claim 6, wherein the platooning controller is configured to determine that the forward vehicle is the platoon vehicle based on the communication information received from the platoon vehicle when the outside vehicle moves to that it is no longer the forward vehicle.

10. The vehicle system of claim 6, wherein the platooning controller is configured to determine whether the forward vehicle is the platoon vehicle or the outside vehicle by comparing a first distance with a second distance, the first distance being obtained based on the sensor information and the second distance being obtained based on GPS information in the communication information.

11. The vehicle system of claim 6, wherein the platooning controller is configured to determine whether the platoon vehicle performs the emergency braking based on an instantaneous variation in required deceleration of the platoon vehicle and a magnitude of change in the required deceleration in the communication information.

12. A platooning control method, comprising:
transmitting and receiving platooning information through communication between platooning vehicles including a host vehicle;
sensing sensor information of a forward vehicle, the forward vehicle being either a platoon vehicle that is platooning in front of the host vehicle or an outside vehicle that cuts in front of the host vehicle;
performing platooning control based on sensor information and communication information received from the platoon vehicle when the platoon vehicle is the forward vehicle;
performing inter-vehicle distance control based on the sensor information of the host vehicle when the outside vehicle is the forward vehicle; and
determining whether the platoon vehicle performs emergency braking based on communication information received from the platoon vehicle when the outside vehicle is the forward vehicle.

13. The platooning control method of claim 12, further comprising determining whether the forward vehicle is the platoon vehicle based on the communication information received from the platoon vehicle when the outside vehicle moves so that it is no longer the forward vehicle.

14. The platooning control method of claim 13, wherein determining whether the forward vehicle is the platoon vehicle comprises comparing a first distance with a second distance, the first distance being obtained based on the sensor information and the second distance being obtained based on GPS information in the communication information.

15. The platooning control method of claim 12, wherein determining whether the platooning vehicle performs the emergency braking comprises determining whether the platoon vehicle performs the emergency braking based on an instantaneous variation in required deceleration of the platoon vehicle and a magnitude of change in the required deceleration in the communication information.

16. The platooning controller of claim 1, wherein the processor is further configured to operate a steering controller, a braking controller and an engine controller.

17. The vehicle system of claim 6, wherein the platooning controller is configured to perform emergency braking of the host vehicle when it is determined that the platooning vehicle performs the emergency braking based on the communication information when the forward vehicle is the outside vehicle.

18. The vehicle system of claim 6, further comprising:
a steering controller configured to control a steering angle of the host vehicle;
a braking controller configured to control braking of the host vehicle; and
an engine controller configured to control driving of an engine of the host vehicle.

19. The vehicle system of claim 6, wherein the sensing device is configured to sense a location, a speed, and a relative distance of the forward vehicle.

20. The method of claim 12, further comprising performing emergency braking upon determining that the platoon vehicle performs emergency braking based on communication information received from the platoon vehicle when the outside vehicle is the forward vehicle.

* * * * *

UNITED STATES PATENT AND TRADEMARK OFFICE
CERTIFICATE OF CORRECTION

PATENT NO. : 11,288,962 B2
APPLICATION NO. : 16/801490
DATED : March 29, 2022
INVENTOR(S) : Jong Su Lim It is certified that error appears in the above-identified patent and that said Letters Patent is hereby corrected as shown below:

On the Title Page

Item (73) Assignees; delete "Cornoration" and insert --Corporation--.

Signed and Sealed this
Twenty-fourth Day of May, 2022

Katherine Kelly Vidal
*Director of the United States Patent and Trademark Office*